(12) United States Patent
Tseng et al.

(10) Patent No.: US 11,125,940 B2
(45) Date of Patent: Sep. 21, 2021

(54) METHOD OF FABRICATION POLYMER WAVEGUIDE

(71) Applicant: Taiwan Semiconductor Manufacturing Company, Ltd., Hsin-Chu (TW)

(72) Inventors: Chun-Hao Tseng, Taichung (TW); Wan-Yu Lee, Taipei (TW); Hai-Ching Chen, Hsinchu (TW); Tien-I Bao, Dayuan Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/564,456

(22) Filed: Sep. 9, 2019

(65) Prior Publication Data

US 2020/0003951 A1    Jan. 2, 2020

Related U.S. Application Data

(63) Continuation of application No. 15/911,403, filed on Mar. 5, 2018, now Pat. No. 10,408,998, which is a (Continued)

(51) Int. Cl.
*G02B 6/12*     (2006.01)
*G02B 6/138*    (2006.01)
(Continued)

(52) U.S. Cl.
CPC ......... *G02B 6/12004* (2013.01); *G02B 6/132* (2013.01); *G02B 6/136* (2013.01);
(Continued)

(58) Field of Classification Search
CPC ................ G02B 6/4214; G02B 6/0083; G02B 2006/12104
See application file for complete search history.

(56) References Cited

U.S. PATENT DOCUMENTS

| 4,936,645 A | 6/1990 | Yoon et al. |
| 5,600,741 A | 2/1997 | Hauer et al. |
| (Continued) | | |

FOREIGN PATENT DOCUMENTS

| JP | 2006330118 A | * 12/2006 |
| JP | 2006330118 A | 12/2006 |

OTHER PUBLICATIONS

English translation of JP2006330118A (Year: 2006).*
Translation of JP2006330118A by Nagaki et al., published Dec. 2006.

*Primary Examiner* — Charlie Y Peng
(74) *Attorney, Agent, or Firm* — Haynes and Boone, LLP

(57) ABSTRACT

A method of fabricating a waveguide device is disclosed. The method includes providing a substrate having an elector-interconnection region and a waveguide region and forming a patterned dielectric layer and a patterned redistribution layer (RDL) over the substrate in the electro-interconnection region. The method also includes bonding the patterned RDL to a vertical-cavity surface-emitting laser (VCSEL) through a bonding stack. A reflecting-mirror trench is formed in the substrate in the waveguide region, and a reflecting layer is formed over a reflecting-mirror region inside the waveguide region. The method further includes forming and patterning a bottom cladding layer in a wave-tunnel region inside the waveguide region and forming and patterning a core layer and a top cladding layer in the waveguide region.

20 Claims, 11 Drawing Sheets

Related U.S. Application Data continuation of application No. 14/715,039, filed on May 18, 2015, now Pat. No. 9,910,217, which is a continuation of application No. 13/399,098, filed on Feb. 17, 2012, now Pat. No. 9,036,956.

(51) Int. Cl.
*G02B 6/132* (2006.01)
*G02B 6/136* (2006.01)
*F21V 8/00* (2006.01)
*G02B 6/42* (2006.01)

(52) U.S. Cl.
CPC .......... *G02B 6/138* (2013.01); *G02B 6/0083* (2013.01); *G02B 6/4214* (2013.01); *G02B 2006/12061* (2013.01); *G02B 2006/12104* (2013.01); *G02B 2006/12121* (2013.01); *G02B 2006/12176* (2013.01)

(56) References Cited

U.S. PATENT DOCUMENTS

| | | | |
|---|---|---|---|
| 6,215,585 B1 | 4/2001 | Yoshimura et al. | |
| 6,438,281 B1 | 8/2002 | Tsukamoto et al. | |
| 6,640,021 B2 | 10/2003 | Pogge et al. | |
| 6,873,636 B2 | 3/2005 | Nakamura et al. | |
| 7,289,701 B2 | 10/2007 | Lam et al. | |
| 7,349,614 B2 | 3/2008 | Doan | |
| 7,529,448 B2 | 5/2009 | Chen et al. | |
| 7,674,391 B2 | 3/2010 | Hamada et al. | |
| 8,324,029 B2 | 12/2012 | Ohtorli | |
| 9,490,148 B2 | 11/2016 | Tseng et al. | |
| 2002/0097961 A1* | 7/2002 | Kazarinov | G02B 6/12011 385/37 |
| 2003/0053770 A1 | 3/2003 | Noddings et al. | |
| 2003/0108269 A1 | 6/2003 | Pogge et al. | |
| 2005/0046011 A1 | 3/2005 | Chen et al. | |
| 2005/0105860 A1 | 5/2005 | Oono et al. | |
| 2005/0286831 A1 | 12/2005 | Ohtsu et al. | |
| 2006/0177188 A1 | 8/2006 | Ishizaki et al. | |
| 2008/0170822 A1* | 7/2008 | Bae | G02B 6/4214 385/18 |
| 2009/0214170 A1 | 8/2009 | Wei et al. | |
| 2010/0195954 A1 | 8/2010 | Asai et al. | |
| 2012/0195336 A1* | 8/2012 | Fang | H01S 5/026 372/45.01 |
| 2015/0253500 A1 | 9/2015 | Tseng et al. | |
| 2018/0188451 A1 | 7/2018 | Tseng et al. | |

* cited by examiner

METHOD OF FABRICATION POLYMER WAVEGUIDE

PRIORITY DATA

The present application is a continuation of U.S. application Ser. No. 15/911,403, filed Mar. 5, 2018, which is continuation of U.S. application Ser. No. 14/715,039, filed May 18, 2015, which is a continuation of U.S. application Ser. No. 13/399,098, filed Feb. 17, 2012, each of which is hereby incorporated by reference in its entirety.

BACKGROUND

Manufacturing of waveguide devices has experienced exponential growth. In general, an optical wave is confined inside a waveguide device by a total internal reflection from the waveguide walls. Among various waveguides, polymer optical waveguides have attracted a lot of attentions because of its process availability and manufacturing feasibility. Traditional method of forming a polymer waveguide over a printed circuit board (PCB) or other carriers is to employ a mold to imprint polymer together with a temperature curing process. However, imprinting process raises challenges to keep an adequate uniformity on whole imprinting area. Moreover, life time of the mold brings another concern.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Figure 1:
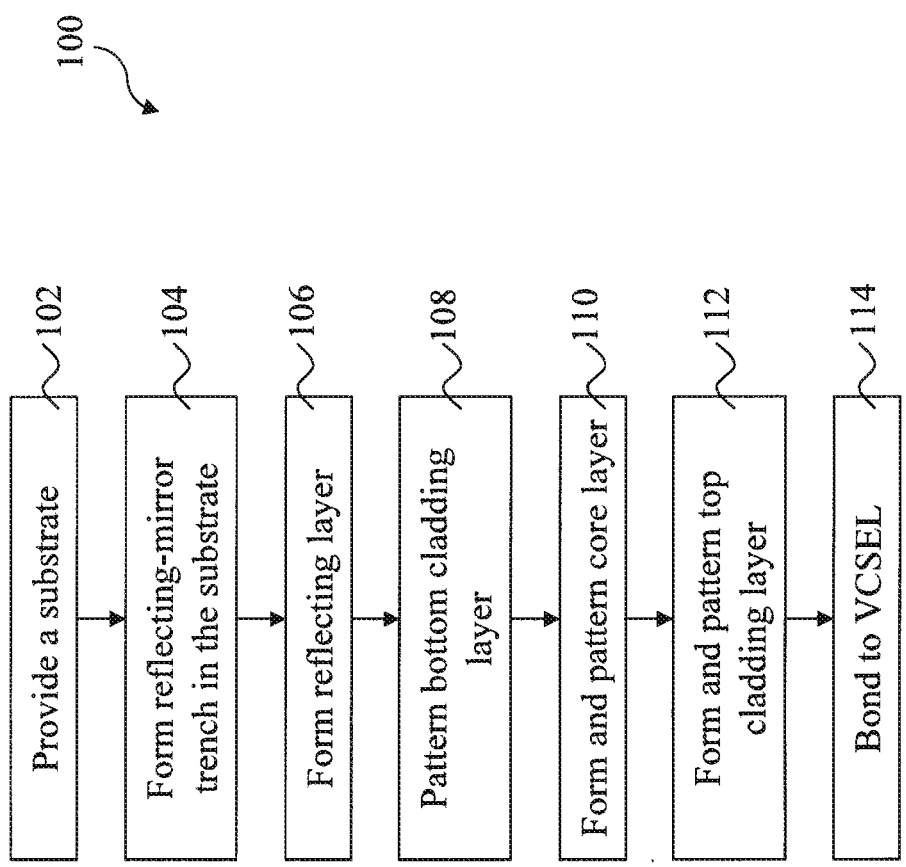
FIG. 1 is a flowchart of an example method for making a waveguide device constructed according to various aspects of the present disclosure.

FIG. 1 is a flowchart of one example embodiment of a method 100 for fabricating a waveguide device 200. The method 100 is described with reference to FIGS. 2 through 10.

The method 100 begins at step 102 by providing a semiconductor substrate 210. The substrate 210 includes silicon. Alternatively, the substrate may include germanium, silicon germanium, gallium arsenide or other appropriate semiconductor materials. Also alternatively, the semiconductor substrate 210 may include an epitaxial layer. For example, the substrate 210 may have an epitaxial layer overlying a bulk semiconductor. Further, the substrate 210 may be strained for performance enhancement. For example, the epitaxial layer may include a semiconductor material different from those of the bulk semiconductor such as a layer of silicon germanium overlying bulk silicon or a layer of silicon overlying a bulk silicon germanium formed by a process including selective epitaxial growth (SEG). Furthermore, the substrate 210 may include a semiconductor-on-insulator (SOI) structure such as a buried dielectric layer. Also alternatively, the substrate may include a buried dielectric layer such as a buried oxide (BOX) layer, such as that formed by a method referred to as separation by implantation of oxygen (SIMOX) technology, wafer bonding, SEG, or other appropriate method. In the present embodiment, the substrate 210 includes silicon with (100) crystal orientation.

Figure 2:
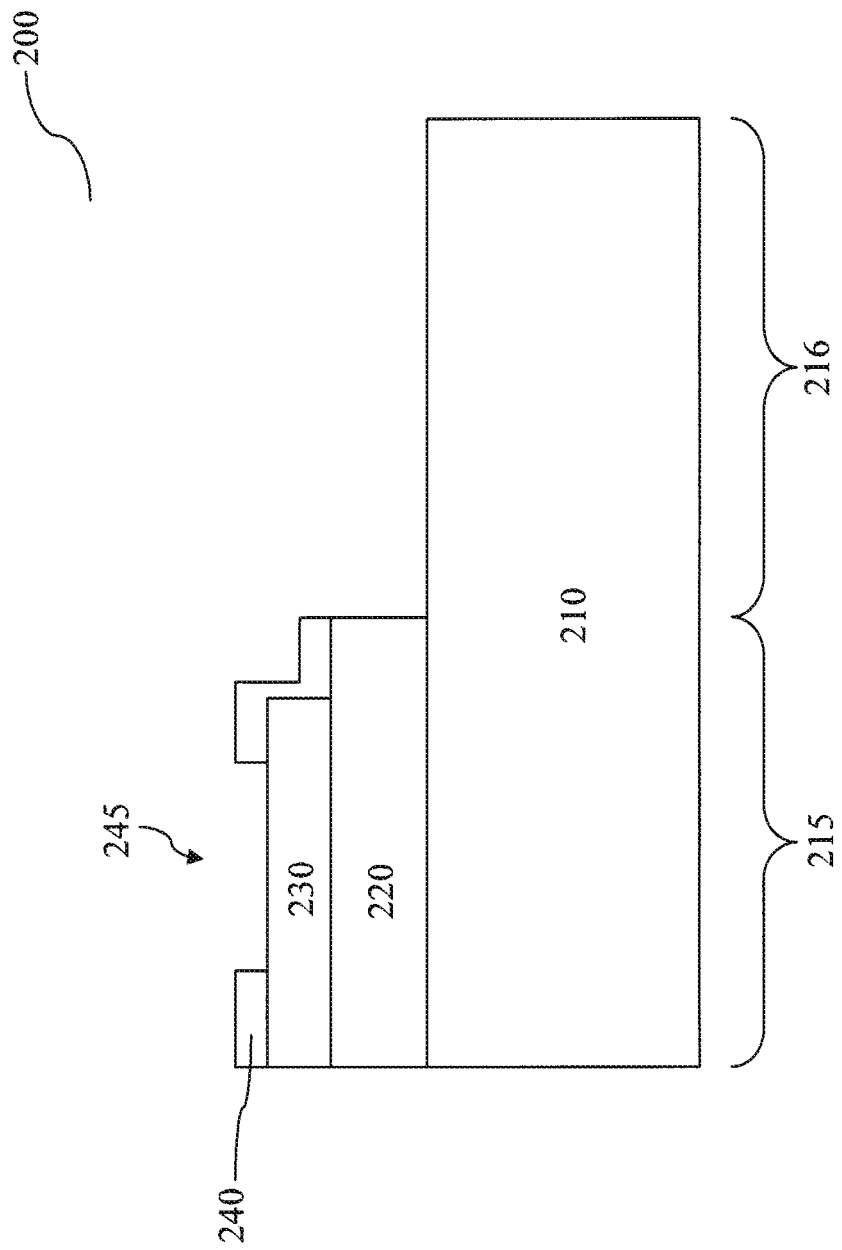
FIGS. 2-11 illustrate cross sectional views of various aspects of one embodiment of fabricating a polymer waveguide device at various stages of processes constructed according to aspects of the present disclosure.

In FIG. 2, the substrate 210 divides into two regions: an electro-interconnection region 215 and a waveguide region 216. The electro-connection region 215 includes a plurality of patterned dielectric layers and patterned conductive layers that provide interconnections (e.g., wiring) between the various components, circuitry, and input/output of an IC device. In the depicted embodiment, a patterned dielectric layer 220 is formed over the substrate 210 in the electro-connection region 215 by depositing, patterning and etching techniques. The dielectric layer 220 may be deposited by chemical vapor deposition (CVD), high density plasma CVD (HDP-CVD), spin-on, physical vapor deposition (PVD or sputtering), or other suitable methods. The dielectric layer 220 may include silicon oxide, silicon nitride, silicon oxynitride, a low-k material, or other suitable materials. Additionally or alternatively, an interfacial layer may be interposed between the substrate 210 and the dielectric layer 220. The interfacial layer may include silicon oxide formed by a proper technique, such as an atomic layer deposition (ALD), thermal oxidation or UV-Ozone Oxidation. In the depicted embodiment, the dielectric layer 220 includes silicon oxide and is deposited by a CVD technique.

Referring to FIG. 2, the dielectric layer 220 is patterned by photolithography and etch processes. An exemplary photolithography process may include processing steps of photoresist coating, soft baking, mask aligning, exposing, post-exposure baking, developing photoresist and hard baking. The photolithography exposing process may also be implemented or replaced by other methods such as maskless photolithography, electron-beam writing, ion-beam writing, and molecular imprint. The etch technique may include dry etch, wet etch, or a combination of dry and wet etch. As an example, a wet etch process may include exposure to a hydroxide containing solution (e.g., ammonium hydroxide), deionized water, and/or other suitable etchant solutions. As another example, a dry etch process may utilize a medium-density plasma etch system equipped with a capacitively coupled plasma source, or a high-density plasma etch system equipped with either inductive, helicon, or electron cyclotron resonance (ECR) plasmas, wherein the exposed material is anisotropically removed by plasma.

In the electro-interconnection region 215, a patterned conductive layer 230, referred to as a patterned redistribution layer (RDL) 230, is formed over the dielectric layer 220 by depositing, patterning and etching techniques. The patterned RDL 230 may contain conductive materials such as aluminum, aluminum/silicon/copper alloy, copper, titanium, titanium nitride, tungsten, metal silicide, or combinations thereof. The patterned RDL 230 may be deposited by a process including PVD, CVD, ALD, or combinations thereof. The patterned RDL 230 is patterned to form a plurality of conductive pads to electrically couple to one or more electronic components of the waveguide device 200 to an external device. The patterning process includes photolithography, etch and photoresist stripping processes. For example, the dry etching process may implement an oxygen-containing gas, fluorine-containing gas (e.g., CF4, SF6, CH2F2, CHF3, and/or C2F6), chlorine-containing gas (e.g., Cl2, CHCl3, CCl4, and/or BCl3), bromine-containing gas (e.g., HBr and/or CHBR3), iodine-containing gas, other suitable gases and/or plasmas, and/or combinations thereof.

Still referring to FIG. 2, a patterned passivation layer 240 is formed over the patterned RDL 230 in the electro-interconnection region 215. The patterned passivation layer 240 includes a silicon nitride or a silicon oxide material, or combinations thereof. The patterned passivation layer 240 is formed by a process that may include CVD, PVD, ALD, combinations thereof, or another suitable process. The patterned passivation layer 240 provides a sealing function for the various features in the electro-connection region 215, so that they are less likely to be eroded or damaged by external components. For example, the patterned passivation layer 240 prevents moisture, dust, and other contaminant particles from reaching inside the waveguide device 200, which may degrade the performance of the inside the waveguide device 200 and/or shorten its lifespan. A plurality of openings 245 are formed in portions of the patterned passivation layer 240 to exposure a portion of the patterned RDL 230. The openings 245 may be formed by photolithography and etch processes in a conventional manner.

Figure 3:
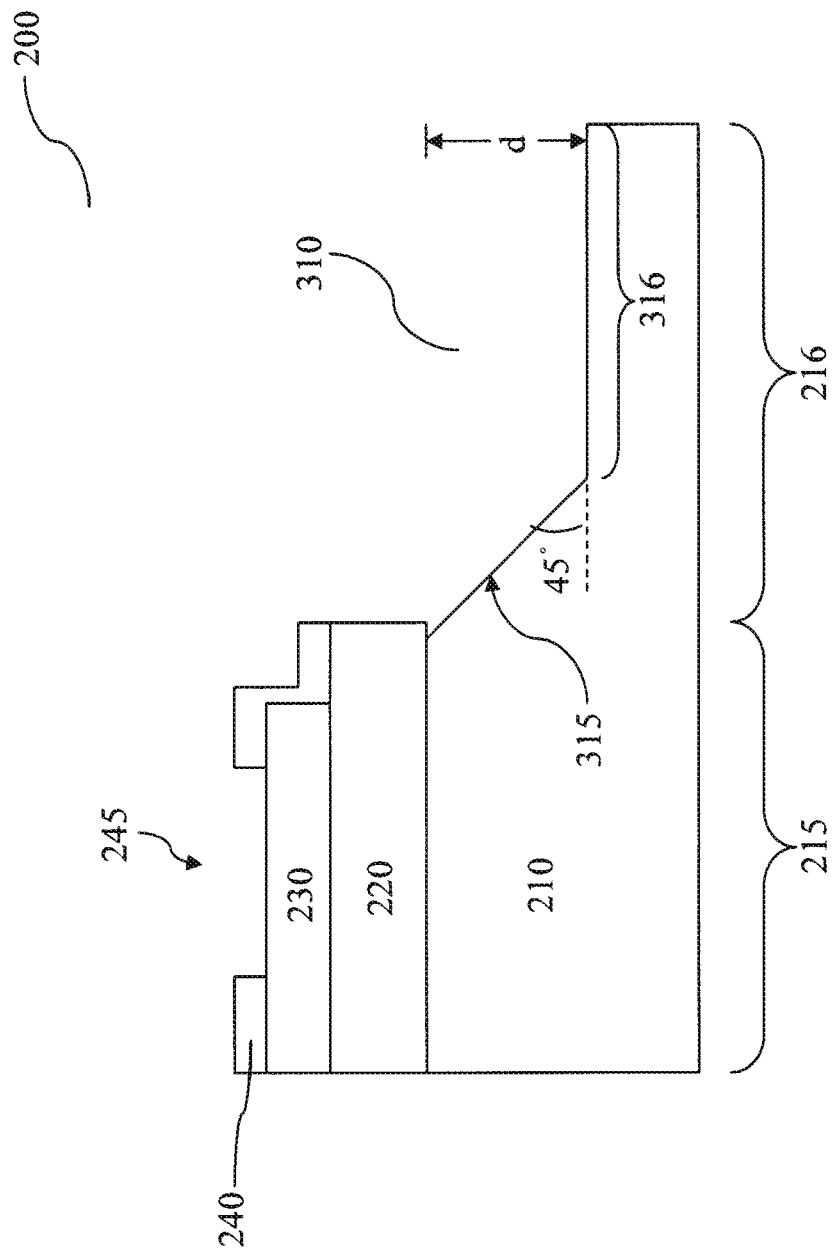

The method 100 proceeds to step 104 to form a reflecting-mirror trench 310 in the waveguide region 216 by etching the substrate 210, as shown in FIG. 3. The reflecting-mirror trench 310 is formed with a sidewall profile of about 45° incline slope (referred to as a reflecting-mirror region 315) and a flat bottom having a depth, d, referred to as a wave-tunnel region 316. The etch technique may include dry etch, wet etch, or a combination of dry and wet etch. As an example, a wet etch may include etchants such as of ethylene diamine pyrocatechol (EDP), potassium hydroxide (KOH), and tetramethyl ammonium hydroxide (TMAH). In order to achieve 45° incline slope, a proper etchant concentration ratio, etching temperature and etching rate is chosen, known in the art. In the depicted embodiment, the substrate 210 is etched by a KOH wet etch and the depth d of the reflecting-mirror trench 310 is about 30 um or larger.

Figure 4:
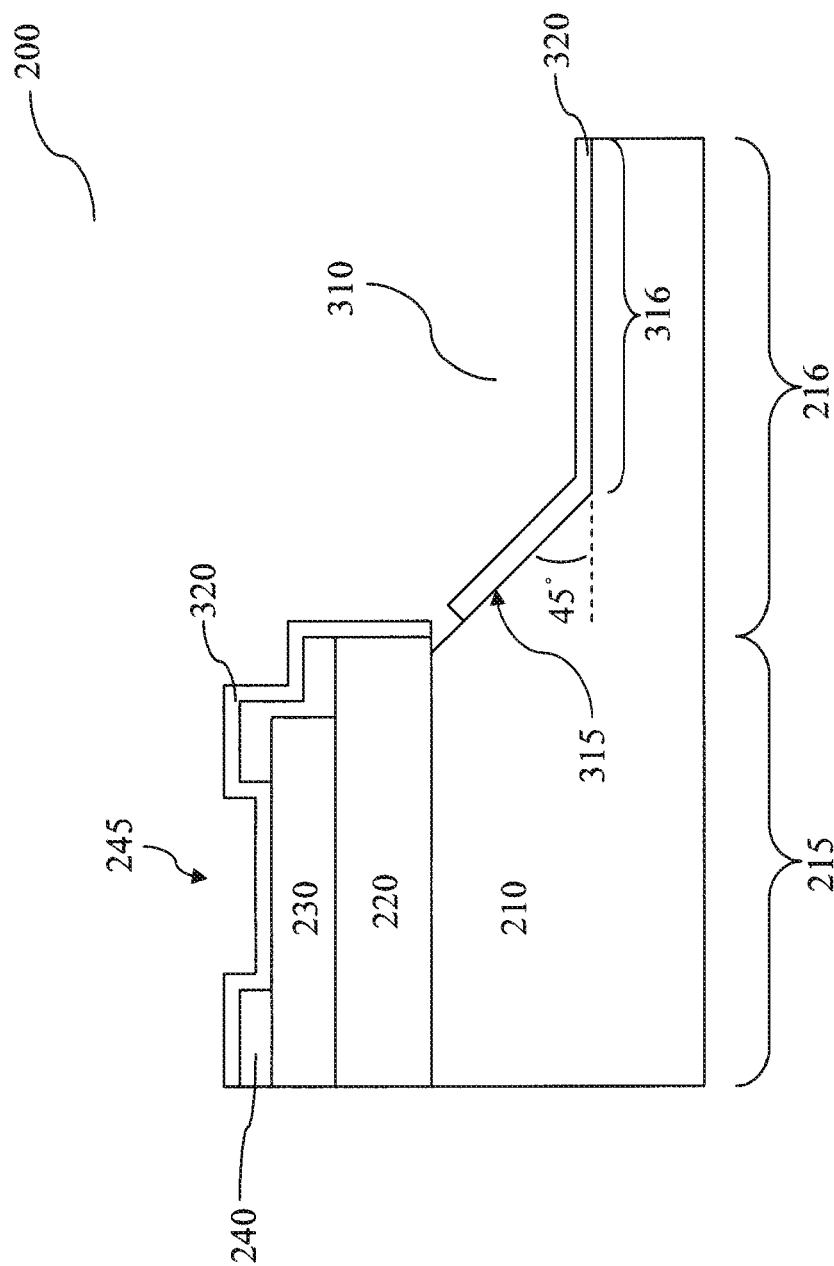

The method 100 proceeds to step 106 by forming a reflecting layer 320 over the substrate 210, as shown in FIG. 4. In the electro-interconnection region, the reflecting layer 320 is disposed over the openings 245 to provide adequate adhesion to the patterned RDL 230 there below and serves as a wetting layer for conductive terminals to be formed above later. In the waveguide region 216, the reflecting layer 320 is disposed on the reflecting-mirror region 315 and the wave-tunnel region 316. The reflecting layer 320 may be selected such that it provides a high reflectivity to a selected radiation type/wavelength (e.g., reflectivity of 70%). The reflecting layer 320 may include aluminum, aluminum/silicon/copper alloy, copper, titanium, titanium nitride, nickel, tungsten, metal silicide, or combinations thereof. The reflecting layer 320 may also include a stack of multiple layers, such as having multiple pairs of molybdenum-silicon or molybdenum-beryllium. The reflecting layer 320 may be formed by various methods, PVD, CVD, a plating process such as electrode-less plating or electroplating, ion beam deposition, and/or other methods known in the art.

Figure 5:
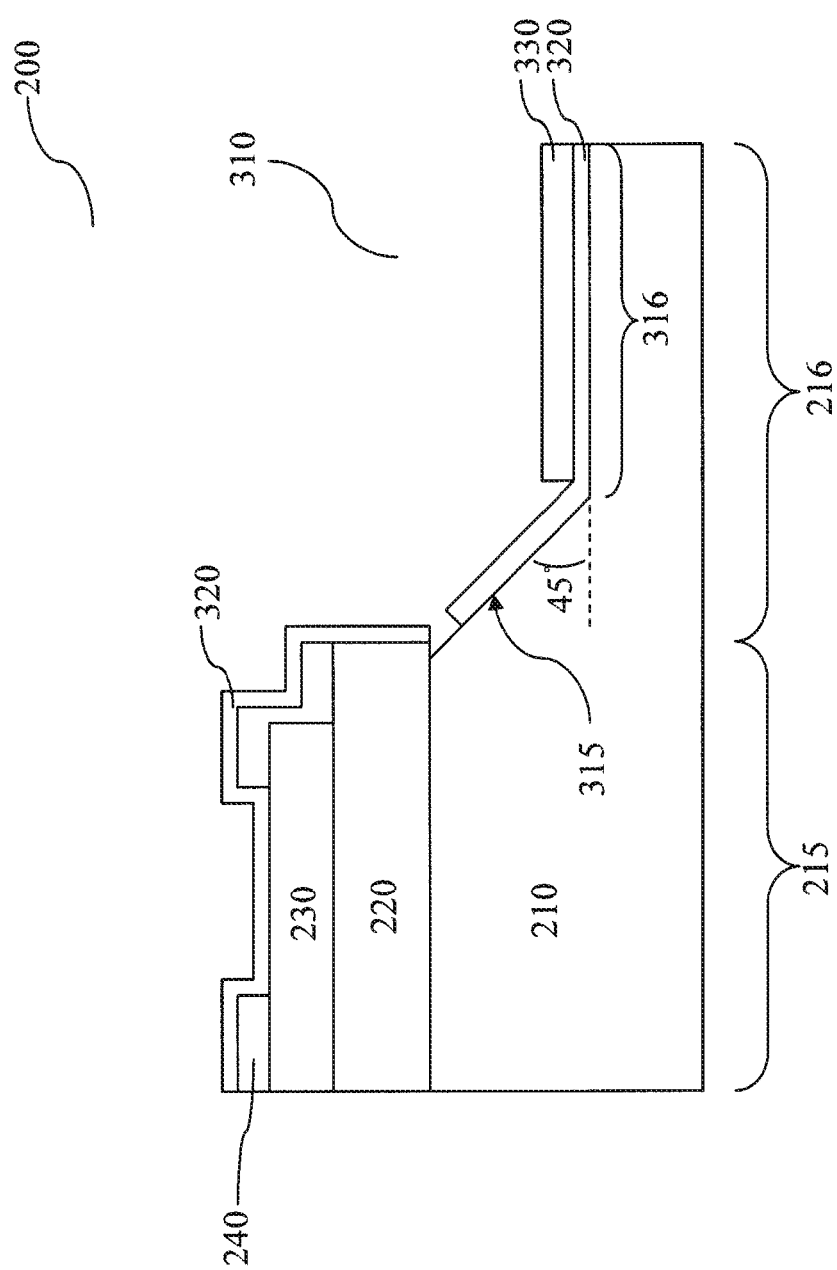

The method 100 proceeds to step 108 by forming a patterned bottom cladding layer 330 in the wave-tunnel region 316, as shown in FIG. 5. The patterned bottom cladding layer 330 includes silicon oxide, silicon nitride, silicon oxynitride, a low-k material. The patterned bottom cladding layer 330 may also include polymers of imide monomers, for example pyromellitic dianhydride monomers, or other suitable materials. The patterned bottom cladding layer 330 may be deposited over the substrate 210 by CVD, HDP-CVD, spin-on-coating, PVD, or other suitable methods. The patterning process may include photolithography, etching and photoresist stripping processes, in a conventional manner.

In the depicted embodiment, the patterned bottom cladding layer 330 includes a negative photo-sensitive polymer material such as Ormoclad (from Micro Resist Technology), which is siloxane based inorganic-organic hybrid material. Alternatively, the photo-sensitive polymer may include a positive photo-sensitive polymer. The patterned bottom cladding layer 330 is formed over the substrate 210 by a spin-on coating process. The formation of the patterned bottom layer 330 in the wave-tunnel region 316 does not require an etching process. Rather, a photolithography process is used to directly transfer a desired pattern from a photomask (not illustrated) to the bottom cladding layer 330 to form the patterned bottom cladding layer 330 in the wave-tunnel region 316. An exposure process is performed on the bottom cladding layer 330 (a photo-sensitive layer). The exposure process includes introducing a radiation beam to the bottom cladding layer 330. The radiation beam may be ultraviolet and/or can be extended to include other radiation beams such as ion beam, x-ray, extreme ultraviolet, deep ultraviolet, and other proper radiation energy. For a negative type of photo-sensitive polymer, the exposed portions of the polymer become insoluble upon exposure, while the unexposed portions remain soluble.

Continuing in step 108, the exposed bottom cladding layer 330 is developed (e.g., a developer is applied to the exposed bottom cladding layer 330 to remove the soluble portions of the layer). The substrate 210 may be immersed in a developer liquid for a predetermined amount of time during which a portion of the bottom cladding layer 330 is dissolved and removed. A separate, additional rinse may also be applied. The composition of the developer solution is dependent on the composition of the bottom cladding layer 330. For example, a base solution of 2.38% (TMAH) is used. However, other compositions suitable compositions now known or later developed are also within the scope of the disclosure. A surfactant may also be included. The surfactant may be selected from surfactants such as, 3M Novec fluid HFE-7000, and/or other surfactants known in the art. The developer may be applied by a puddling process, immersion, spray, and/or other suitable methods.

Figure 6:
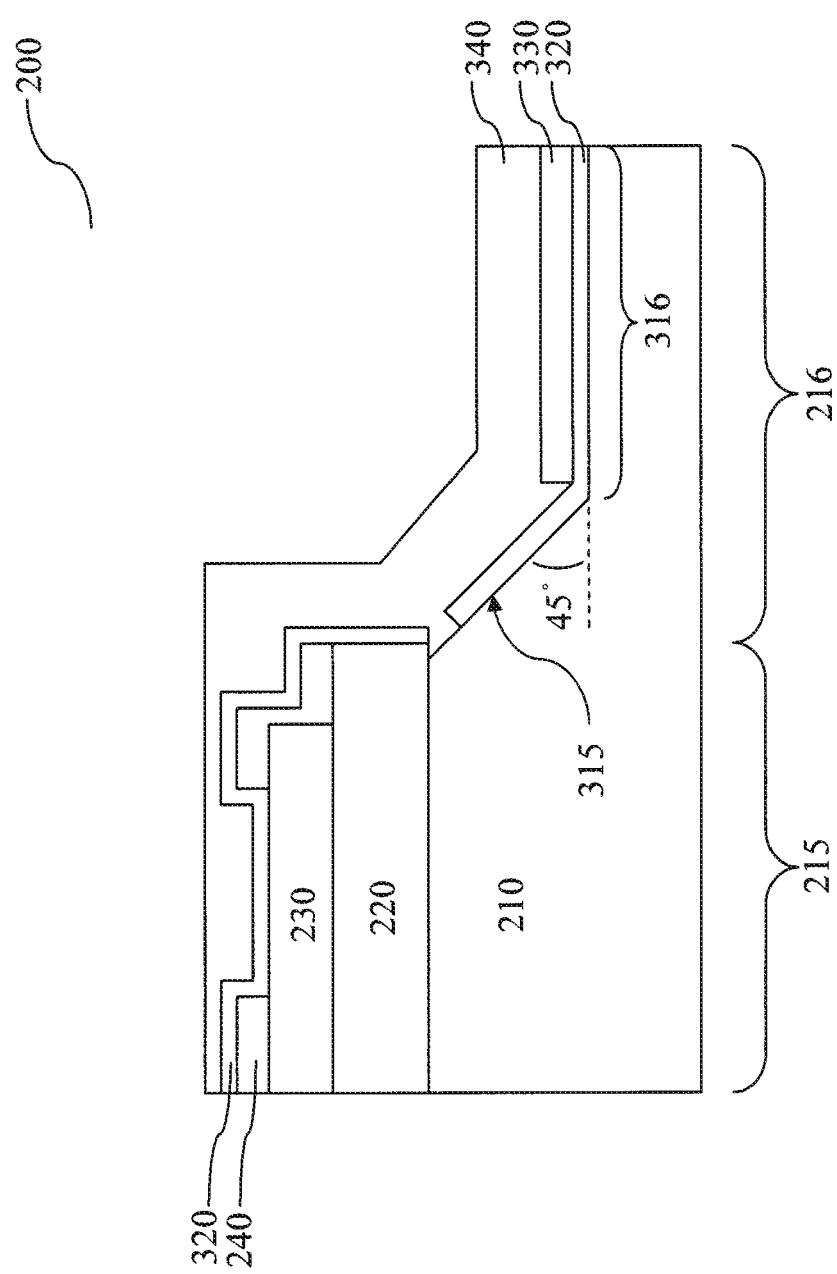
Figure 7:
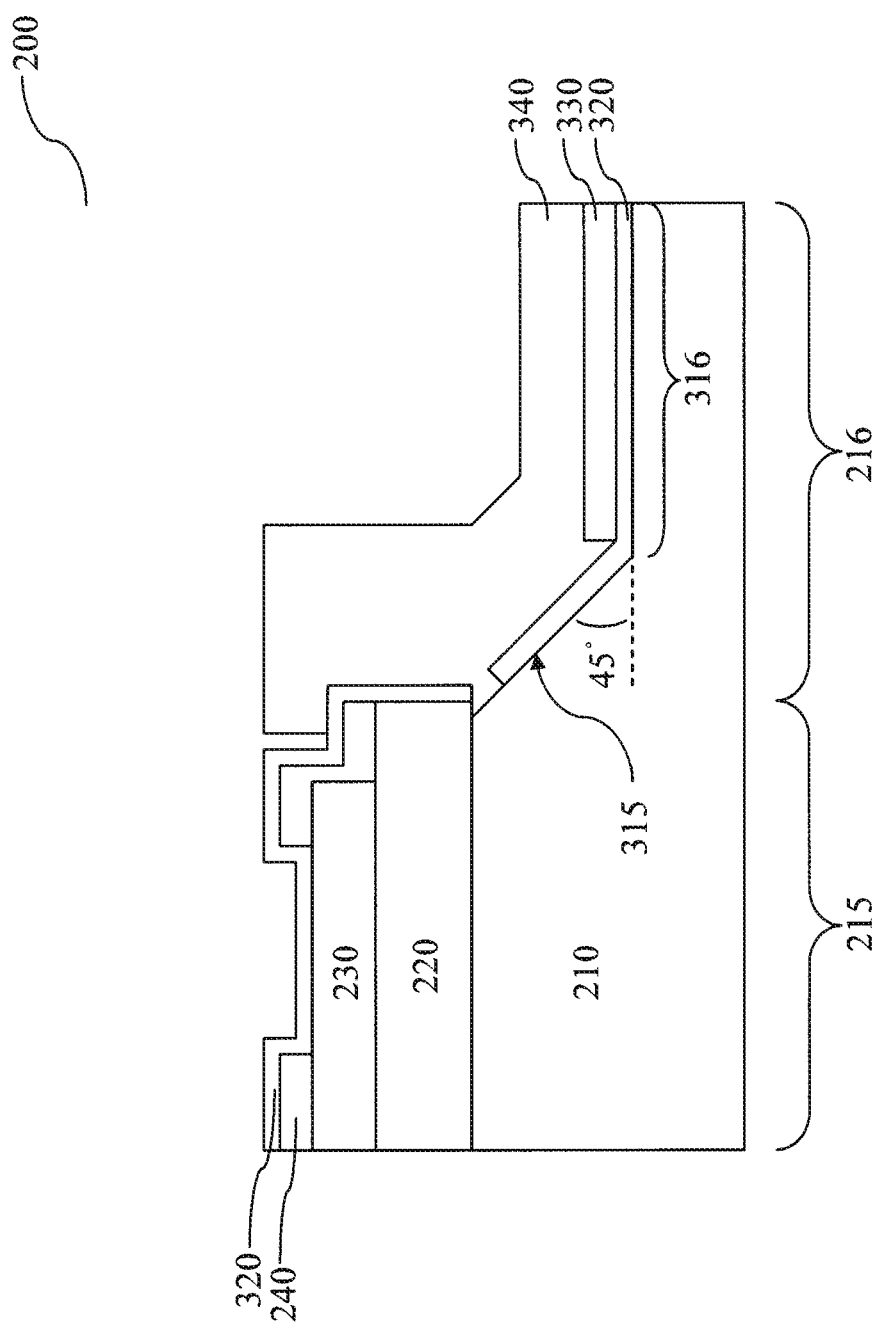

The method 100 proceeds to step 110 by forming and patterning a core layer 340 in the waveguide region 216, as shown in FIGS. 6 and 7. The core layer 340 includes a photo-sensitive polymer, such as Epocore (from Micro Resist Technology), which is an epoxy based polymer. In the depicted embodiment, the core layer 340 is coated by a spin-on process. The spin-on process may include multi-steps with different spin speeds in each step. The spin-on process starts with a low spin speed (referred to as an initial step) to coat the core layer 340 uniformly over the substrate 210. Then the spin-on process proceeds to a faster main spin step to achieve a target coating thickness of the core layer 340. Then the main spin step is followed by another low spin speed step or a non-spin step (referred to as a waiting step) to allow the core layer 340 to reflow and achieve a more conformable coating profile along the topography of the substrate 210, especially in a conjunction with the electro-interconnection region 215 and the reflecting-mirror region 315. As an example, spin speed of the initial step is within a range of 300~1500 rpm while the spin speed of the waiting step is less than 500 rpm. As another example, the spin speed of the waiting step is set as zero. The spin speed of the main spin step is determined by characteristics of the core layer 340, such as material type, viscosity and spin-curve. In the present embodiment, a target of thickness of the core layer 340 is approximately to half the depth of the reflecting mirror trench (d). By using an optimized spin-on process, the core layer 340 may cover the inclined reflecting-mirror region 315 without forming extrusion bump, which can be hider the later assembly process.

Still continuing in step 110, the processes of patterning the core layer 340 is similar in many respects to those discussed above in association with the patterning process of the patterned bottom cladding layer 330. The patterned core layer 340 is formed over the reflecting layer 320 in the reflecting-mirror region 315 and over patterned bottom cladding layer 330 in the wave-tunnel region 316, as shown in FIG. 7.

Figure 8:
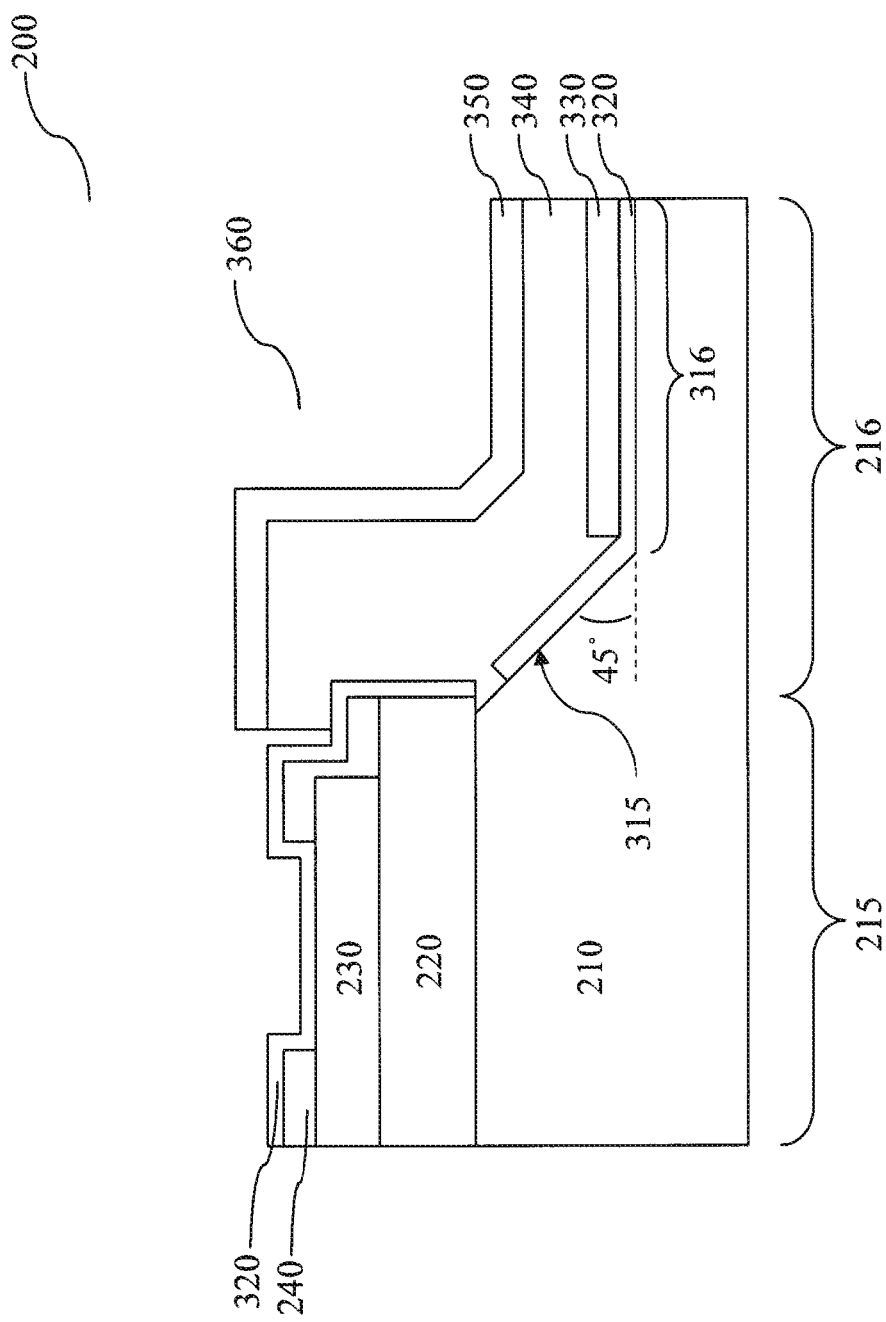

The method 100 proceeds to step 112 by forming and patterning a top cladding layer 350 in the waveguide region 216, as shown in FIG. 8. The top cladding layer 350 may include the same polymer as the patterned bottom cladding layer 330 or a different polymer. The patterned top cladding layer 350 is formed over the patterned core layer 340. In the present embodiment, the process of forming the top cladding layer 350 is similar in many respects to those discussed above in association with the coating process of the core layer 340. The processes of patterning the top layer 350 is similar in many respects to those discussed above in association with the patterning process of the patterned bottom cladding layer 330.

Referring also to FIG. 8, a waveguide structure 360 is formed in the reflecting-mirror region 315 and the wave-tunnel region 316. In the reflecting-mirror region 315, the waveguide structure 360 has the patterned top cladding layer 350 (on top of the core layer 340), the patterned core layer 340 on top of the reflecting layer 320. In the wave-tunnel region 316, the waveguide structure 360 has the patterned top cladding layer 350 (on top of the core layer 340), the patterned core layer 340 (on top of the bottom cladding layer 330), the bottom cladding layer 330 on top of the reflecting layer 320.

Refractive indexes among the patterned bottom cladding layer 330, the patterned core layer 340 and the patterned top cladding layer 350 are configured to obtain a total wave reflection, for a target wavelength or wavelength range, from interfaces of the patterned core layer and the patterned bottom/top cladding layers. Thus a wave propagates inside the patterned core layer 340 in a "zigzag" way along the waveguide tunnel. In the depicted embodiment, the refractive index of the patterned core layer 340 is at least 0.025 larger than those of the patterned cladding layers 330 and 350. The patterned core layer 340 and the patterned cladding layers 330/350 are selected to be transparent to communication wavelength (600 nm-1600 nm) and have less than 2% volume and thickness variation during a subsequent bonding process, which will be described later.

Figure 9:
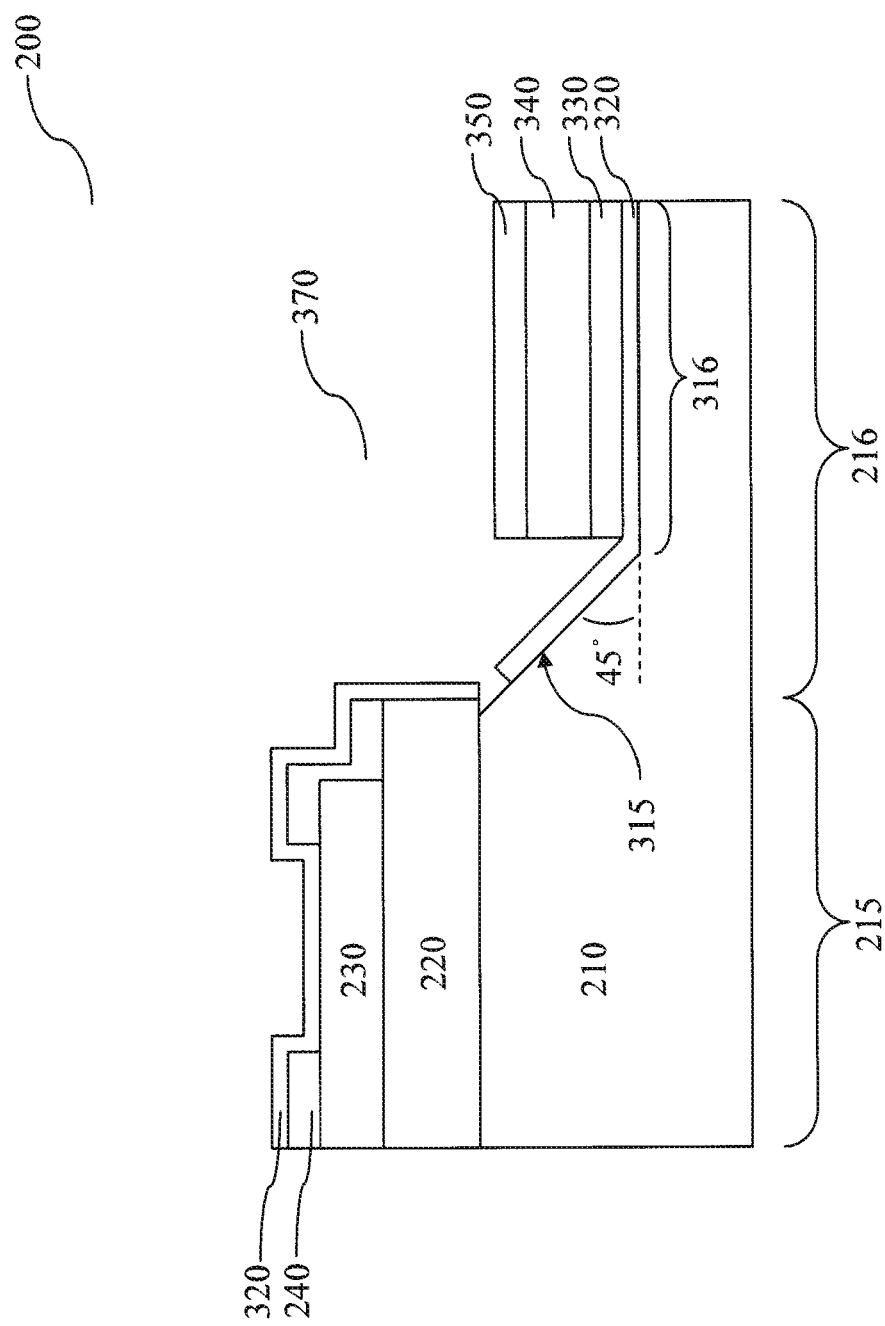

In another embodiment, a waveguide structure 370 is formed in the reflecting-mirror region 315 and the wave-tunnel region 316, as shown in FIG. 9. In the reflecting-mirror region 315, both the patterned top cladding layer 350 and the core layer 340 are removed by a patterning process. Meanwhile in the wave-tunnel region 316, the waveguide structure 370 has the patterned top cladding layer 350 (on top of the patterned core layer 340), the patterned core layer 340 (on top of the bottom cladding layer 330), the patterned bottom cladding layer 330 on top of the patterned the reflecting layer 320. In the waveguide structure 370, a vacancy space is formed above the reflecting layer 320 in the reflecting-mirror region 315. One or more functionary elements, such as ball lenses or micro-lenses may be built in the vacancy space.

The method 100 proceeds to step 114 by bonding the waveguide device 200 with an external device through a bonding stack 405. The bonding stack 405 may include solder balls or solder bumps. The bonding stack 405 may also include multiple bonding metals, such as gold (Au), gold tin (AuSn), gold indium (AuIn), or other suitable metal to achieve eutectic boding or other wafer bonding mechanism. The bonding stack 405 allows external devices to be electrically coupled to (or gain electrical access to) the waveguide device 200. The bonding stack 450 may be formed by evaporation, electroplating, printing, jetting, stud bumping, or other suitable techniques. The external device may include laser diodes, photo detectors, integrated optical circuits, or other optical components. In the present embodiment, the external device includes a vertical-cavity surface-emitting laser (VCSEL) 410.

Figure 10:
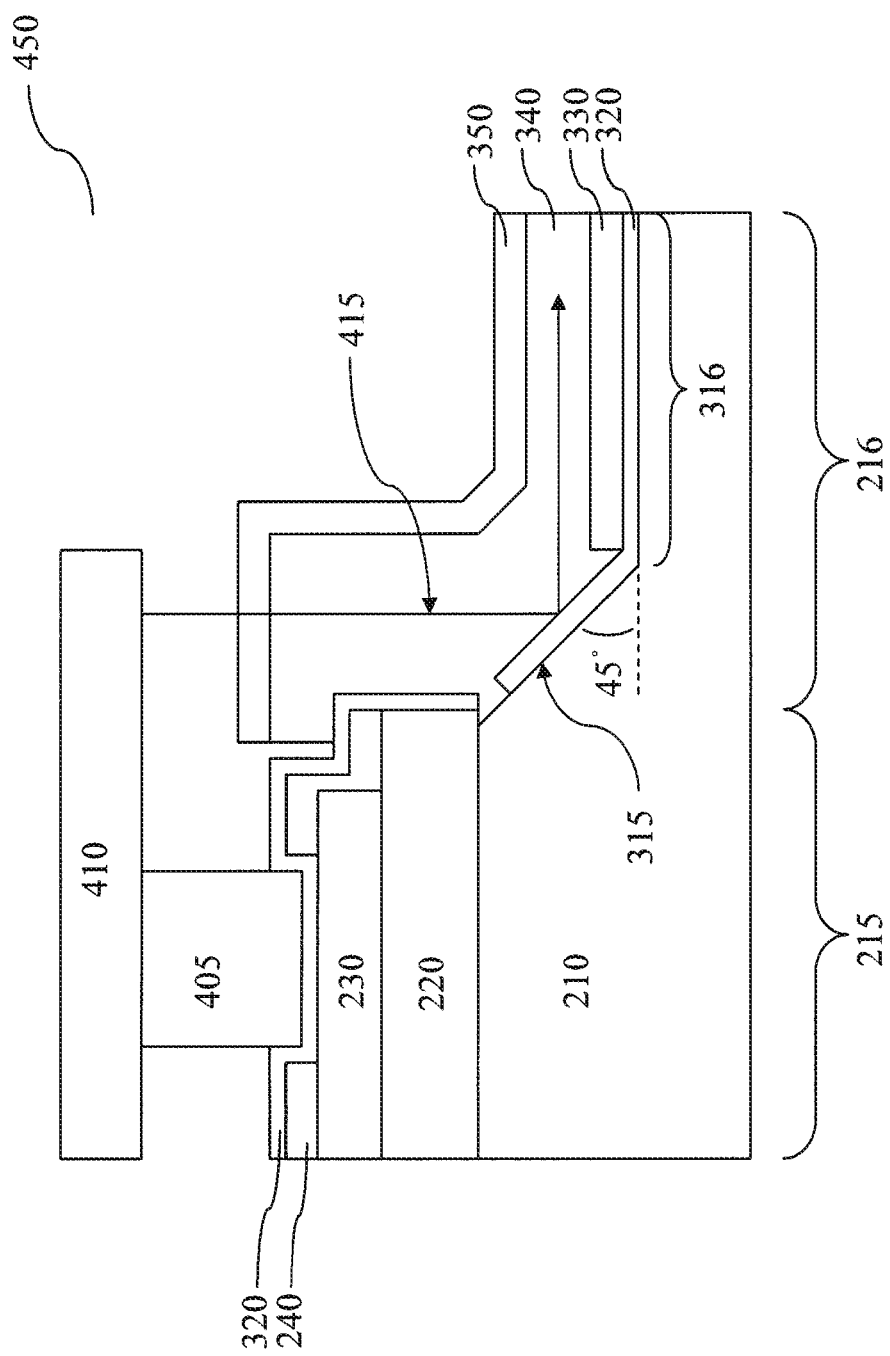
Figure 11:
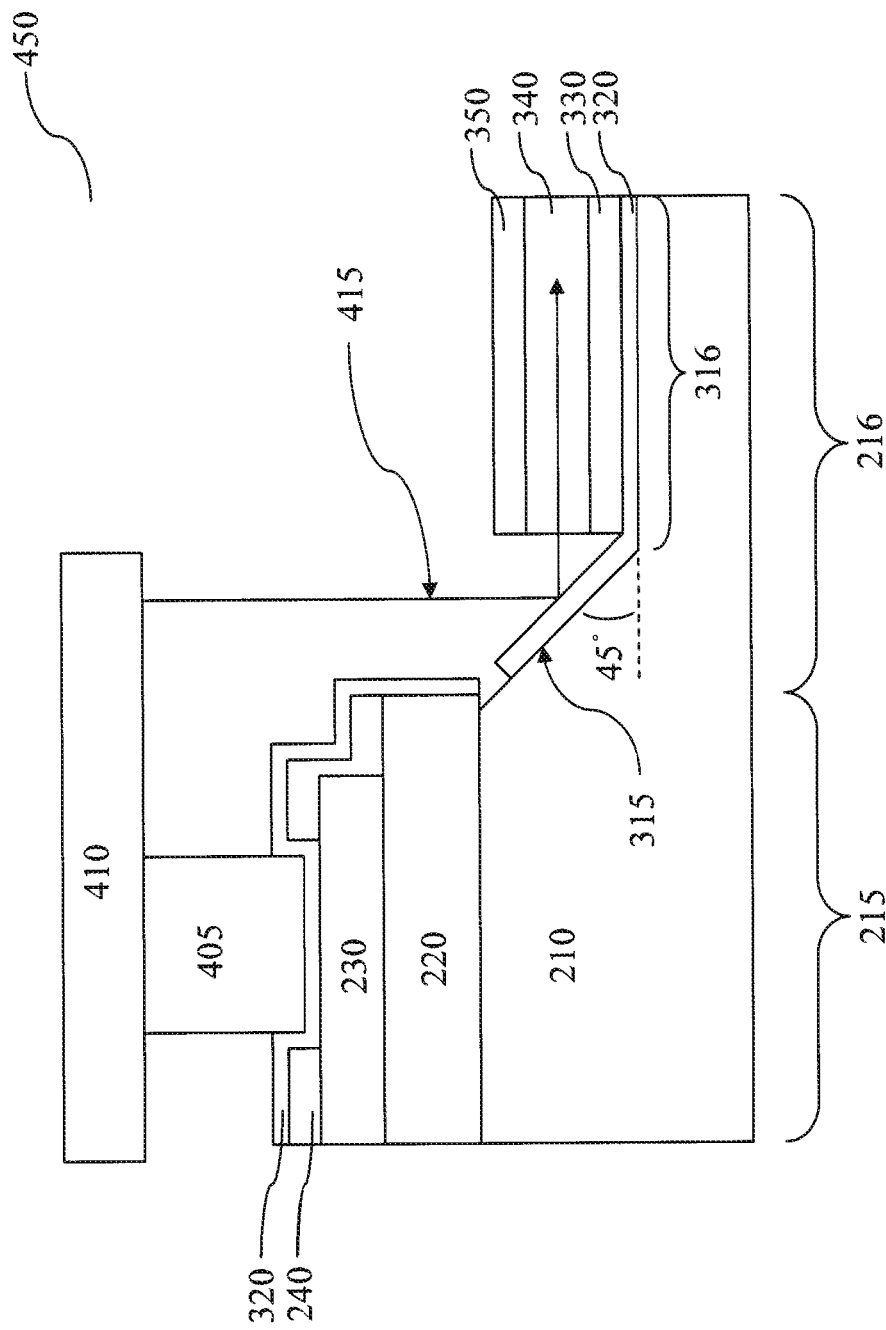

The bonding process may involve techniques such as a flip-chip or a wire bonding. In the depicted embodiment, a flip-chip technique is applied during the bonding process to bond the VCSEL 410 to the waveguide device 200 together to form a device pair 450, as shown in FIGS. 10 and 11. A flip-chip technique is a method to directly connect a face-down (hence, "flipped") a first electronic component on to a second electronic component, by means of conductive bumps that have been deposited onto pads on a top side of the first electronic component and conductive pads that have been deposited onto corresponding locations on the second electronic component.

Referring to FIG. 10, an incident light beam 415 emits from the VCSEL 410 and travels through the patterned top cladding layer 350 and the patterned core layer 340, injects on surface of the reflecting layer 320 in the reflecting-mirror region 315, reflects its direction in 90° by the 45° reflecting-mirror inclined slop, is directed into the patterned core layer 340 in the waveguide-tunnel region 316. The light beam 415 is confined in the patterned core layer 340 by a total internal reflection. The light beam 415 is reflected back and forth between the two interfaces of the patterned core layer 340 and propagates along the waveguide tunnel.

Referring to FIG. 11, it is similar in many respects to those discussed above in association with FIG. 10, except that the incident light beam 415 emitting from the VCSEL 410 injects directly on the surface of the reflecting layer 320 in the reflecting-mirror region 315. With one or more embedded functionary elements, such as a focusing element, in the vacancy space above the reflecting layer 320 in the reflecting-mirror region 315, the light beam 415 may be modulated to improve optical performance or apply other suitable functions.

Based on the discussions above, it can be seen that the present disclosure offers the method 100 to fabricate a polymer waveguide on a semiconductor substrate by using photo-sensitive polymer with designed refractive index contrast and thickness. The waveguide tunnel is formed by well-known techniques, such as spin-on coating and photolithography patterning. It has been demonstrated that a uniform coverage of the patterned core layer and the patterned top cladding layers in the reflecting-mirror region, will enhance the efficiency of coupling light into the waveguide tunnel. The method 100 provides a bump-less deposition (coating) process to form the patterned core layer and the patterned top/bottom cladding layers, which significantly simplifies the fabrication process to avoid a further planarization process. The method 100 provides robust waveguide processes without imprinting by using mold. It improves waveguide device reliability and life-time.

The foregoing outlines features of several embodiments so that those skilled in the art may better understand the aspects of the present invention. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
   a substrate having a first region and a second region, wherein the second region of the substrate is defined by a first surface that interfaces with a second surface at an obtuse angle;
   a reflecting layer disposed over the first and second regions of the substrate, wherein the reflecting layer includes a first portion disposed over the first region of the substrate and a second portion disposed over the second region of the substrate, the first portion of the reflecting layer being discontinuous with respect to the second portion of the reflecting layer;
   a first cladding layer disposed over the reflecting layer in the first region of the substrate without extending to the second region of the substrate;
   a core layer disposed over the first cladding layer;
   a second cladding layer disposed over the core layer; and
   a laser device operable to direct a light at the reflecting layer disposed along the first surface of the substrate.

2. The device of claim 1, wherein a portion of the first surface is not covered by the reflecting layer.

3. The device of claim 2, wherein the reflecting layer is disposed over a second portion of the first of the substrate.

4. The device of claim 1, further comprising:
   a dielectric layer disposed over the first region of the substrate without extending to the second region of the substrate;
   a redistribution layer disposed over the first region of the substrate without extending to the second region of the substrate; and
   a passivation layer disposed over the first region of the substrate without extending to the second region of the substrate, and
   wherein the reflecting layer is disposed over at least one of the dielectric layer, the redistribution layer and the passivation layer over the first region of the substrate.

5. The device of claim 4, further comprising a conductive feature coupling the laser device to the reflecting layer disposed over the first region of the substrate.

6. The device of claim 1, wherein the obtuse angle is such that light directed at the reflecting layer disposed along the first surface of the substrate via the laser device is redirected into at least the core layer.

7. The device of claim 1, wherein the first cladding layer includes a first polymer,
   wherein the core layer includes a second polymer that is different from the first polymer,
   wherein the second cladding layer includes a third polymer that is different from the first polymer and the second polymer.

8. The device of claim 1, wherein the first cladding layer includes a first polymer,
   wherein the core layer includes a second polymer that is different from the first polymer,
   wherein the second cladding layer includes the first polymer.

9. A device comprising:
   a substrate having a first region and a second region, wherein the second region of the substrate has a first surface and a second surface that interfaces with the first surface at an angle;
   a reflecting layer disposed over the first surface of the second region of the substrate, the reflecting layer formed of a different material than the first surface of the substrate;
   a first cladding layer disposed over the second surface;
   a core layer disposed over the first and second surfaces of the second region of the substrate, wherein the core layer physically contacts a portion of the first surface of the second region of the substrate;
   a second cladding layer disposed over the core layer in the second region of the substrate; and
   a laser device operable to direct a light beam at the reflecting layer disposed over the first surface of the second region of the substrate.

10. The device of claim 9, wherein a refractive index of the core is larger than a refractive index of the first cladding layer and a refractive index of the second cladding layer.

11. The device of claim 9, further comprising:
    a conductive layer disposed over the substrate in the first region; and
    a passivation layer disposed over the conductive layer in the first region.

12. The device of claim 11, wherein the reflecting layer is disposed over and physically contacts the conductive layer and the passivation layer in the first region of the substrate.

13. The device of claim 12, wherein the core layer is disposed over and physically contacts the reflecting layer in the first region of the substrate.

14. The device of claim 9, wherein the light beam directed at the reflecting layer via the laser device passes through the second cladding layer and the core layer prior to reaching the reflecting layer.

15. The device of claim 9, wherein the reflecting layer is disposed over the second surface of the second region of the substrate, and
    wherein the reflecting layer is disposed over the first region of the substrate.

16. A device comprising:
a substrate having a first region and a second region, wherein the second region interfaces with the first region;
a redistribution layer disposed over the substrate in the first region;
a passivation layer disposed directly on the redistribution layer in the first region;
a reflecting layer disposed directly on the passivation layer in the first region and directly on a top surface of the substrate in the second region of the substrate, wherein a portion of the top surface is exposed by the reflecting layer;
a first cladding layer disposed over the top surface of the second region of the substrate;
a core layer disposed directly on the first cladding layer; and
a second cladding layer disposed directly on the core layer.

17. The device of claim 16, wherein the top surface of the substrate in the second region of the substrate includes a first segment and a second segment, the first segment being inclined relative to the second segment.

18. The device of claim 17, wherein the reflecting layer is disposed along a portion of the first segment and the second segment, and
wherein the first cladding layer, the core layer and the second cladding layer are disposed over the second segment.

19. The device of claim 16, wherein the core layer is disposed directly on the portion of the top surface that is exposed by the reflecting layer.

20. The device of claim 16, further comprising an optical device operable to direct a light beam at the reflecting layer that is disposed directly on the top surface of the substrate in the second region of the substrate.

* * * * *